(12) United States Patent
Bengtzohn (10) Patent No.: US 11,357,169 B2
(45) Date of Patent: Jun. 14, 2022

(54) CUTTING DECK HEIGHT ADJUSTMENT SYSTEM FOR A RIDING LAWN CARE VEHICLE

(71) Applicant: HUSQVARNA AB, Huskvarna (SE)

(72) Inventor: Johan Bengtzohn, Tenhult (SE)

(73) Assignee: Husqvarna AB, Huskvarna (SE)

( * ) Notice: Subject to any disclaimer, the term of this patent is extended or adjusted under 35 U.S.C. 154(b) by 262 days.

(21) Appl. No.: 16/465,724

(22) PCT Filed: Mar. 28, 2018

(86) PCT No.: PCT/IB2018/052125
§ 371 (c)(1),
(2) Date: May 31, 2019

(87) PCT Pub. No.: WO2018/185609
PCT Pub. Date: Oct. 11, 2018

(65) Prior Publication Data
US 2019/0327887 A1 Oct. 31, 2019

Related U.S. Application Data

(60) Provisional application No. 62/481,283, filed on Apr. 4, 2017.

(51) Int. Cl.
*A01D 34/74* (2006.01)
*A01D 34/66* (2006.01)
*A01D 101/00* (2006.01)

(52) U.S. Cl.
CPC ........... *A01D 34/74* (2013.01); *A01D 34/662* (2013.01); *A01D 2101/00* (2013.01)

(58) Field of Classification Search
CPC ...... A01D 34/54; A01D 34/662; A01D 34/66; A01D 34/64; A01D 2034/6843;
(Continued)

(56) References Cited

U.S. PATENT DOCUMENTS 3,375,645 A * 4/1968 Miller ............... A01D 34/82
56/16.2
4,577,455 A * 3/1986 Amano ............. A01D 34/64
56/17.1
(Continued)

FOREIGN PATENT DOCUMENTS

CN 104272918 A 1/2015
CN 105682447 A 6/2016
(Continued)

OTHER PUBLICATIONS

International Search Report and Written Opinion for International Application No. PCT/IB2018/052125 dated Jun. 14, 2018.

*Primary Examiner* — Alicia Torres
*Assistant Examiner* — Madeline I Runco
(74) *Attorney, Agent, or Firm* — Burr & Forman, LLP (57) ABSTRACT

A height adjustment system for adjusting a cutting deck height of a front mounted cutting deck (50) of a riding lawn care vehicle (10) may include a lever (155) operable by an operator seated on the riding lawn care vehicle, and a height adjustment assembly (150) that is alternately assembled and disassembled during attachment and removal of the cutting deck without any operator interaction other than positioning of the lever.

18 Claims, 7 Drawing Sheets

(58) Field of Classification Search
CPC .. A01D 2034/645; A01D 34/81; A01D 34/74; A01B 59/064
See application file for complete search history.

(56) References Cited

U.S. PATENT DOCUMENTS

| | | | | |
|---|---|---|---|---|
| 4,664,405 A * | 5/1987 | Bedis | ........... | A01B 63/104 172/298 |
| 4,809,489 A * | 3/1989 | Johansson | ........... | A01D 34/64 56/14.7 |
| 4,934,130 A * | 6/1990 | Johansson | ........... | A01D 34/64 56/17.2 |
| 5,079,926 A * | 1/1992 | Nicol | ........... | A01D 34/74 404/91 |
| 5,154,043 A * | 10/1992 | Schemelin | ........... | A01B 59/044 56/12.7 |
| 5,187,925 A * | 2/1993 | Patterson | ........... | A01D 34/74 56/14.9 |
| 5,410,865 A * | 5/1995 | Kurohara | ........... | A01D 34/74 56/15.9 |
| 5,653,466 A * | 8/1997 | Berrios | ........... | A01D 34/64 180/19.1 |
| 5,758,478 A * | 6/1998 | Bando | ........... | A01D 34/662 56/15.2 |
| 5,816,033 A * | 10/1998 | Busboom | ........... | A01D 34/74 56/10.8 |
| 5,915,487 A * | 6/1999 | Splittstoesser | ........... | B62D 51/04 180/19.1 |
| 5,956,932 A * | 9/1999 | Schmidt | ........... | A01D 34/64 56/15.6 |
| 6,122,903 A * | 9/2000 | Hayashi | ........... | A01D 34/74 56/15.7 |
| 6,276,119 B1 * | 8/2001 | Oshima | ........... | A01D 34/74 56/15.9 |
| 6,293,077 B1 * | 9/2001 | Plas | ........... | A01D 34/64 56/17.1 |
| 6,516,597 B1 | 2/2003 | Samejima et al. | | |
| 6,658,831 B2 * | 12/2003 | Velke | ........... | A01D 34/64 56/14.7 |
| 7,013,626 B1 * | 3/2006 | Strope | ........... | A01D 34/68 56/15.8 |
| 7,028,456 B2 * | 4/2006 | Thatcher | ........... | A01D 34/74 56/15.6 |
| 7,540,135 B2 * | 6/2009 | Strope | ........... | A01D 34/74 56/14.9 |
| 7,716,906 B2 * | 5/2010 | Swart | ........... | A01D 34/74 56/17.1 |
| 8,091,329 B2 * | 1/2012 | Schick | ........... | A01D 34/74 56/15.9 |
| 8,266,879 B2 * | 9/2012 | Samejima | ........... | A01D 34/74 56/17.1 |
| 8,397,367 B2 * | 3/2013 | Melone | ........... | A01D 34/64 29/428 |
| 8,794,660 B1 * | 8/2014 | Stover | ........... | H05K 999/99 280/727 |
| 8,919,087 B2 * | 12/2014 | Lancaster | ........... | A01D 34/74 56/17.1 |
| 9,288,940 B2 * | 3/2016 | Berglund | ........... | A01D 34/64 |
| 9,516,809 B2 * | 12/2016 | Wright | ........... | A01D 34/74 |
| 2004/0221561 A1 * | 11/2004 | Koehn | ........... | A01D 34/662 56/15.9 |
| 2009/0182471 A1 * | 7/2009 | Bucher | ........... | A01D 34/662 701/50 |
| 2009/0183480 A1 | 7/2009 | Schick | | |
| 2012/0000173 A1 * | 1/2012 | Papke | ........... | A01D 34/82 56/14.7 |
| 2013/0074464 A1 | 3/2013 | Gindt et al. | | |
| 2016/0050847 A1 * | 2/2016 | Bartel | ........... | A01D 34/64 56/15.2 |

FOREIGN PATENT DOCUMENTS

| | | | | |
|---|---|---|---|---|
| EP | 3178305 B1 * | 8/2020 | ........... | A01D 34/64 |
| WO | 2013/016196 A1 | 1/2013 | | |

* cited by examiner

CUTTING DECK HEIGHT ADJUSTMENT SYSTEM FOR A RIDING LAWN CARE VEHICLE

CROSS REFERENCE TO RELATED APPLICATIONS

This application claims priority to U.S. application No. 62/481,283 filed Apr. 4, 2017, the entire contents of which are hereby incorporated by reference in its entirety.

TECHNICAL FIELD

Example embodiments generally relate to lawn care vehicles with a front mounted cutting deck and, more particularly, relate to a height adjustment system for adjusting the cutting deck height of such a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle. Furthermore, riding lawn care vehicles can sometimes be configured with various functional accessories (e.g., trailers, tillers, plows, snow blower attachments, lawn cutting blade attachments, bagging attachments and/or the like) to enable them to tackle numerous different tasks depending on the accessories added thereto.

As can be appreciated from the description above, riding lawn care vehicles may come in many different sizes and may have wide variances in their capabilities. However, beyond mere changes in size and function, riding lawn care vehicles can also be produced with a great deal of variation in relation to the configurations via which various ones of the functions they can perform are provided. For example, some riding yard maintenance vehicles may have attachments that are rear mounted, front mounted, or even mounted between the front and rear wheels. The many possible variations in configuration may enable designers to produce specific device configurations that are able to excel in certain difficult operating environments. However, with regard to these different possible configurations and attachments, there is typically a balance between ease and convenience of switching configurations or attachments and the capabilities of such configurations or attachments. For example, in a typical case, the easiest attachment to add to a device is often the least capable attachment. Similarly, an attachment with significant capabilities is typically very complicated to connect due to the complexity associated with enabling all of the capabilities during the attachment process. Thus, it may be desirable to develop highly capable attachments that are also relatively simple and easy to connect to the riding lawn care vehicle.

BRIEF SUMMARY OF SOME EXAMPLES

Accordingly, some example embodiments may provide a structure for employment in connection with a riding lawn care vehicle to which accessories are front mounted. In this regard, some example embodiments may provide an improved equipment frame to which a front mounted cutting deck or other accessories may be mounted with relative ease and convenience. Moreover, the structure of some example embodiments may allow for a relatively straight forward process to attach or remove the cutting deck, but do so for a cutting deck that is also relatively capable. For example, some example embodiments may provide a cutting deck that can have height remotely adjusted with a height adjustment assembly that does not require any user interaction to setup when the cutting deck is attached to the vehicle.

For example, in one embodiment of the invention, a riding lawn care vehicle is provided. The riding lawn care vehicle may include a vehicle frame, a mobility assembly operably coupled to the vehicle frame, an equipment frame operably coupled to the vehicle frame, wherein the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade, an attachment frame, and a housing frame, and a height adjustment system comprising a lever. The housing frame may be configured to support a housing inside which the cutting blade is housed. The attachment frame may be configured to operably couple to the equipment frame to dock the cutting deck with the riding lawn care vehicle. The lever may be operable by the operator positioned on the riding lawn care vehicle. The cutting deck may be configured to automatically switch from a disconnected state to a connected state in response to docking the cutting deck with the riding lawn vehicle. In the connected state, the lever may be configured to adjust the height of the cutting deck relative to the ground surface over which the riding lawn care vehicle operates. In the disconnected state, the lever is not configured to adjust the height of the cutting deck.

In another example embodiment, a height adjustment system for adjusting a cutting deck height of a front mounted cutting deck of a riding lawn care vehicle is provided. The system includes a lever operable by an operator seated on the riding lawn care vehicle, and a height adjustment assembly that is alternately assembled and disassembled during attachment and removal of the cutting deck without any operator interaction other than positioning of the lever.

In still another example, a riding lawn care vehicle is provided that includes a vehicle frame, a mobility assembly operably coupled to the vehicle frame, an equipment frame operably coupled to the vehicle frame, wherein the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade, an attachment frame, and a housing inside which the cutting blade is housed, and a height adjustment system comprising a first portion and a second portion. The first portion is operably coupled to the vehicle frame and comprises an operator control, a first cable, and a first pivot arm, and the second portion is operably coupled to the cutting deck and comprises a second pivot arm and a second cable. The attachment frame is configured to operably couple to the equipment frame to dock the cutting deck with the riding lawn care vehicle. The operator control is operable by the operator positioned on the riding lawn care vehicle. The operator control is operably coupled to the first pivot arm via the first cable. The second pivot arm is operably coupled to the housing via the second cable. The operator control is configured to adjust the height of the cutting deck relative to the ground surface over which the riding lawn care vehicle operates by transferring force from the first cable to the second cable via the first pivot arm and the second pivot arm.

Some example embodiments may improve an operator's ability to employ a front mounted model of a lawn care vehicle to accomplish various yard maintenance activities. The user experience associated with changing the cutting height of the riding lawn care vehicle may also be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3, which is defined by FIGS. 3A, 3B and 3C, illustrates the mating of the equipment frame with the cutting deck in accordance with an example embodiment;

FIG. 4, which is defined by FIGS. 4A and 4B, illustrates components of the height adjustment assembly according to an example embodiment;

FIG. 7, which is defined by FIGS. 7A and 7B, illustrates a structure of the interaction between the attachment frame and the housing frame in greater detail to explain how pendulum motion can be accounted for in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other. Although terms such as equipment, attachment, accessory and/or the like may each be used to generally interchangeably to describe components of various devices, some of these terms may be used to differentiate certain components of example embodiments for purposes of clarity.

Figure 1:
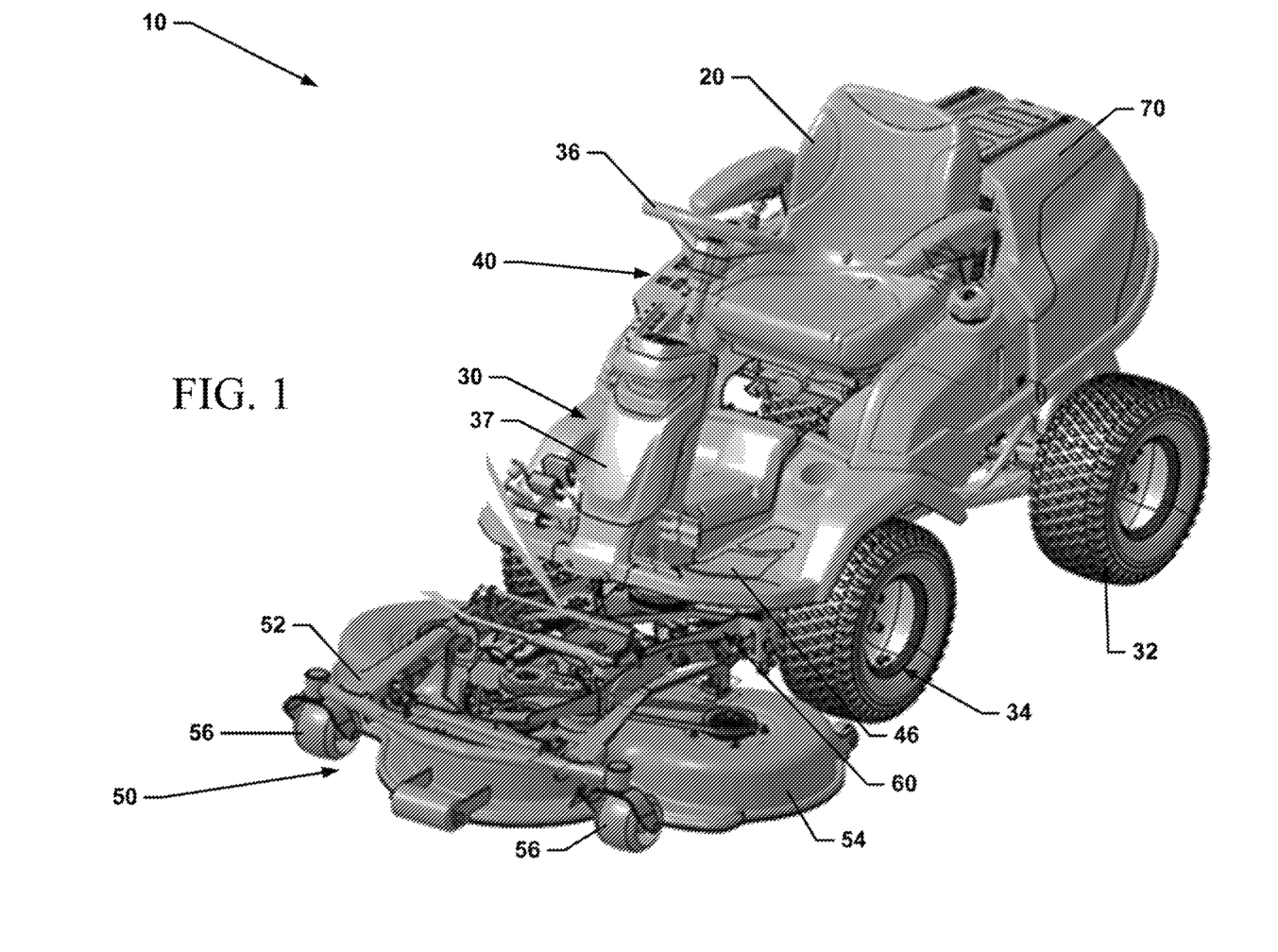
FIG. 1 illustrates a perspective view of a front mount riding lawn care vehicle according to an example embodiment.

Some example embodiments may improve operator comfort, ease of maintenance, operability, and overall device utility of lawn care vehicles such as, for example, riding lawn mowers with an equipment frame that is front mounted. In this regard, FIG. 1 illustrates a perspective view of a riding lawn care vehicle 10 that includes a front mounted equipment frame according to an example embodiment. FIGS. 2-7 illustrate various additional views of components or portions of the riding lawn care vehicle 10 according to an example embodiment.

FIG. 1 illustrates a riding lawn care vehicle 10 that may include a seat 20 that may be disposed at a center, rear or front portion of the riding lawn care vehicle 10. Terms such as front, forward, rear and rearward, should generally be understood to be considered relative to the normal driving direction of the riding lawn care vehicle 10 and direction the operator faces. The operator faces forward and toward the front of the riding lawn care vehicle 10 during normal operation in the normal driving direction. The riding lawn care vehicle 10 may also include a steering assembly 30 (e.g., a steering wheel, handle bars, joystick(s) or the like) operably coupled to rear wheels 32 of the riding lawn care vehicle 10 to allow the operator to steer the riding lawn care vehicle 10 via steering inputs that are communicated to the rear wheels 32. Since steering control is provided to the rear wheels 32, the front wheels 34 may not receive steering inputs in some embodiments. However, it may be possible to reverse the arrangement described above such that the front wheels 34 receive steering inputs and the rear wheels 32 do not in alternative embodiments. Regardless of the steering paradigm employed, the operator may sit on the seat 20, which may be disposed to the rear of the steering assembly 30 to provide input for steering of the riding lawn care vehicle 10 via the steering assembly 30. Additionally, although this example shows a mobility assembly including wheels, it is also possible for the mobility assembly to include tracks.

In an example embodiment, the steering assembly 30 may include a steering wheel 36 and a steering column 37. The steering column 37 may operably couple the wheels to which steering inputs are provided to communicate steering inputs inserted at the steering wheel 36 to (in this case) the rear wheels 32 via mechanical and/or electrical connections. The riding lawn care vehicle 10 may also include additional control related components that may be disposed at a control panel 40. The control related components may include levers, buttons, switches and/or the like configured to provide control over certain functions or components such as a blade speed adjuster, a choke control, a cutting height adjuster and/or a cutting unit controller. In some embodiments, one or more additional controllers, may be provided in the form of foot pedals that may sit proximate to a footrest 46 (which may include a portion on both sides of the riding lawn care vehicle 10 (e.g., on opposite sides of the steering column 37)) to enable the operator to rest his or her feet thereon while seated in the seat 20. These foot pedals may provide speed control for forward and/or rearward operation, braking, cutting deck lifting or other functions.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding lawn care vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, some example embodiments may provide that the grass clippings may be captured by a collection system, mulched, or expelled from the cutting deck 50 (e.g., via a discharge that may be directed to a side or rear of the cutting deck 50 and/or riding lawn care vehicle 10).

The cutting deck 50 may include an attachment frame 52 to which a housing 54 and caster wheels 56 (and/or other supporting wheels) are attached. The cutting deck 50 may also include a cover (not shown) that may cover some portions of the attachment frame 52 and/or the housing 54 to protect such components or to improve the aesthetic appearance of the cutting deck 50. The attachment frame 52 may be connectable to an equipment frame 60 of the riding lawn care vehicle 10. The equipment frame 60 may be attached to a frame of the riding lawn care vehicle 10 at a front portion of the riding lawn care vehicle 10. In some cases, the equipment frame 60 may extend forward from a portion of the riding lawn care vehicle 10 that is between the front wheels 34. The attachment frame 52 may therefore be alternately connected to and disengaged from the equipment frame 60 to create two distinct states for the riding lawn care vehicle 10, namely a connected state and a disconnected state. Additionally, in some embodiments, the connected state may have two further states or positions including an operational position in which the cutting deck is substantially parallel to the ground for cutting grass and a service position in which the cutting deck is substantially perpendicular to the ground for servicing components of the cutting deck.

In some embodiments, the cutting deck 50 may be replaced by other working attachments to change the configuration of the riding lawn care vehicle 10 and correspondingly change the tasks that may be performed by the riding lawn care vehicle 10. Thus, for example, a plow blade or snow blower attachment may be provided to convert the riding lawn care vehicle 10 into a snow removal device. Alternatively, a tiller attachment may be provided to convert the riding lawn care vehicle 10 into a ride-on or remote control operable tiller. Other attachments and configurations are also possible such as, for example, brush cutter attachments, utility bucket attachments, flail mower attachments, snow thrower attachments, broom attachments, blower attachments, folding plough attachments, and/or the like. These attachments may, in some cases, be or further include working assemblies (e.g., a cutting deck may include a blade as a working assembly). In each case, the attachment frame 52 may be disengaged from the equipment frame 60 to place the riding lawn care vehicle 10 in the disconnected state. Thereafter, one of the other attachments may be attached to the equipment frame 60 to place the riding lawn care vehicle 10 in a connected state relative to the one of the other attachments.

In the pictured example embodiment of FIG. 1, an engine of the riding lawn care vehicle 10 is disposed in an engine compartment 70 that is behind a seated operator in a rear portion of the riding lawn care vehicle 10. However, in other example embodiments, the engine could be in different positions such as in front of or below the operator, and the operator may be standing at a stand-on operator location. In some embodiments, the engine may be operably coupled to one or more of the wheels of the riding lawn care vehicle 10 in order to provide drive power for the riding lawn care vehicle 10. In some embodiments, the engine may be capable of powering two wheels, while in others, the engine may power all four wheels of the riding lawn care vehicle 10. Moreover, in some cases, the engine may manually or automatically shift between powering either some wheels or all four wheels of the riding lawn care vehicle 10. The engine may be a petrol engine, or may be replaced by an electric motor in some cases.

The engine, the steering assembly 30, the cutting deck 50, the seat 20 and other components of the riding lawn care vehicle 10 may be operably coupled to the frame (e.g., vehicle frame or chassis) of the riding lawn care vehicle 10. The frame may be a rigid structure configured to provide support, connectivity and interoperability functions for various ones of the components of the riding lawn care vehicle 10. In some embodiments, the frame may be split or articulated such that, for example, the front wheels 34 are disposed on an opposite portion of the frame than the portion of the frame on which the rear wheels 32 are disposed with respect to an articulated joint in the frame. In some embodiments, the articulated joint may form a linkage arrangement that may, in some cases, be referred to as a "dog-bone" articulated arrangement.

Figure 2:
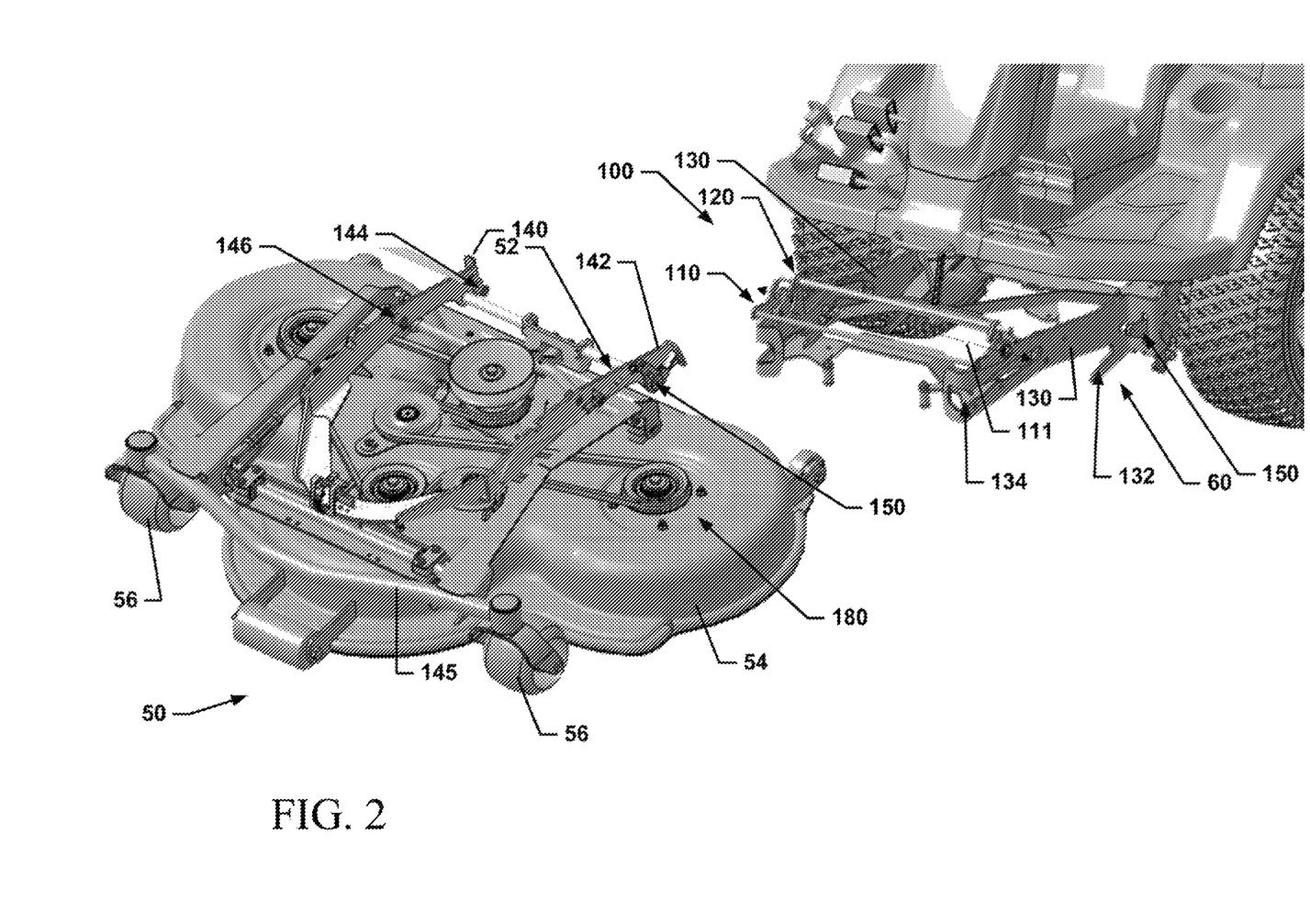
FIG. 2 illustrates a perspective view of the riding lawn care vehicle of FIG. 1 with a cutting deck removed according to an example embodiment.

Referring now to FIG. 2, in which the riding lawn care vehicle 10 is shown in the disconnected state, various components of the cutting deck 50 and equipment frame 60 will be discussed. As shown in FIG. 2, the equipment frame 60 may include a latching assembly 100 configured to enable operably coupling the attachment frame 52 to the equipment frame 60 in either the service position or the operational position. Thus, in some cases, the latching assembly 100 may include separate latches or structural assemblies for each respective position. However, the latching assembly 100 could alternatively include one structural assembly that accomplishes both tasks. In the example of FIG. 2, the latching assembly 100 includes a service lock latch 110 configured to operably couple the attachment frame 52 to the equipment frame 60 in the service position (e.g., for cleaning or maintenance on components of the cutting deck 50), and includes an equipment lock latch 120 configured to operably couple the attachment frame 52 to the equipment frame 60 in the operational position (e.g., for cutting grass via the blades inside the cutting deck 50).

The latching assembly 100 may be operably coupled to guide rails 130 that form a portion of the equipment frame 60. The guide rails 130 may be operably coupled to the frame of the riding lawn care vehicle 10 forward of and between the front wheels 34. The guide rails 130 may, in some cases, extend substantially parallel to each other and substantially parallel to a longitudinal centerline of the riding lawn care vehicle 10. In some cases, the guide rails 130 may also extend substantially parallel to the ground surface. The guide rails 130 may be formed from sheet metal or metallic bars and may, in some cases, be operably coupled to each other via cross members. The cross members may provide structural support to the guide rails 130 and, in some cases, may provide positioning services relative to belt guiding or alignment as discussed in greater detail below.

In an example embodiment, each of the guide rails 130 may include a respective instance of a guide slot 132 and a positional adjustment slot 134. The guide slot 132 may be located rearward of the positional adjustment slot 134 along the length of the guide rails 130. In some cases, the guide slot 132 may have a generally V shape with a wider open end and a relatively narrow apex. The V shape may be opened or oriented in the forward direction, and may be disposed on a bottom side of the guide rail 130 to open generally forward and slightly downward. The positional adjustment slot 134 may be disposed from a distal end of the guide rail 130 and extend along a longitudinal length of the guide rail 130 toward a longitudinal center of the guide rail 130. Both the service lock latch 110 and the equipment lock latch 120 may be disposed proximate to the positional adjustment slot 134.

The service lock latch 110 may be pivotally attached to each of the guide rails 130 and extend therebetween to pivot about a pivot axis 111. The service lock latch 110 may be configured to engage a portion of the cutting deck 50 to lock the cutting deck 50 into a service position when the cutting deck is rotated out of the operational position and into the service position. The equipment lock latch 120 may also be pivotally attached to each of the guide rails 130 and extend therebetween to pivot about a second pivot axis 121. The equipment lock latch 120 may be configured to engage a portion of the cutting deck 50 to lock the cutting deck 50 into engagement with the equipment frame 60 in the connected state.

The attachment frame 52 may include a first rail 140 and a second rail 142 that are substantially parallel to each other, and spaced apart from each other by a distance. In some embodiments, that distance is either slightly more than or less than the distance that separates the guide rails 130. In the example of FIG. 2, the distance between the first and second rails 140 and 142 is slightly larger than the distance between the guide rails 130 so that, when aligned, the first and second rails 140 and 142 are configured to mate with outside edges of the guide rails 130. The inside facing sides of the first and second rails 140 and 142 may each include connection studs (e.g., a first set of connection studs 144 and a second set of connection studs 146) that face each other. When the guide rails 130 are aligned with the first and second rails 140 and 142 for mating of the equipment frame 60 and the attachment frame 52, the first set of connection studs 144 may ride into the guide slots 132 on the guide rails 130, while the second set of connection studs 146 ride into the positional adjustment slots 134 on the guide rails 130. Accordingly, the first set of connection studs 144 may be located at a lower elevation (relative to the ground) than the second set of connection studs 146 to allow the first set of connection studs 144 to pass underneath the distal ends of the guide rails 130 to reach the guide slots 132. The first connection studs 144 may rest in the guide slots 132 without any specific structure being employed to retain the first connection studs 144 in the guide slots 132. However, the second connection studs 146 may be retained in the positional adjustment slots 134 by the equipment lock latch 120.

The attachment frame 52 of the cutting deck 50 may be operably coupled to a housing frame 145 in such a way that allows cutting height adjustments to be made by altering the height of the cutting deck 50. For example, the attachment frame 52 may be rigidly mountable to the equipment frame 60 and the housing frame 145 may be rigidly mounted to the housing 54, but the housing frame 145 may be adjustably mounted relative to the attachment frame 52 based on operation of a height adjustment assembly 150. As shown in FIG. 2, the height adjustment assembly 150 is split between the cutting deck 50 and the equipment frame 60. In other words, one portion of the height adjustment assembly 150 is disposed at the equipment frame 60, while another portion of the height adjustment assembly 150 is disposed at the attachment frame 52 of the cutting deck 50. As will be described in greater detail below, mating or docking of the cutting deck 50 with the equipment frame 60 will result in the operable coupling of the two portions of the height adjustment assembly 150 without any manual interaction needed by the operator.

The height adjustment assembly 150 may be adjusted to alter a pivot point or multiple pivot points at which the housing frame 145 is operably coupled to the attachment frame 52. By changing the orientation of the housing frame 145 relative to the fixed height of the attachment frame 52, the relative height of the castor wheels 56 (which are carried on the housing frame 145) may be adjusted to correspondingly adjust cutting height. In an example embodiment, the height adjustment assembly 150 may be operated remotely by operation of a lever 155 (see FIG. 6) or other operator control disposed, for example, at the control panel 40. The lever 155 may be operably coupled to the height adjustment assembly 150 via a Bowden cable or other flexible member (e.g., a wire) via which forces may be transmitted as described in greater detail below in reference to FIGS. 3-7.

The cutting deck 50 houses one or multiple blades in the housing 54, as mentioned above. The blade or blades are driven by a blade drive system 180 that includes a series of pulleys and at least one flexible driving member (e.g., a belt). The blade drive system 180 may be operably coupled to an equipment drive system of the riding lawn care vehicle upon mating or docking of the cutting deck 50 with the equipment frame 60. Moreover, in some examples, the blade drive system 180 may automatically be connected (e.g., without tools or operator interaction with the belt or flexible driving member) when the mating or docking is accomplished.

Figures 3A, 3B:
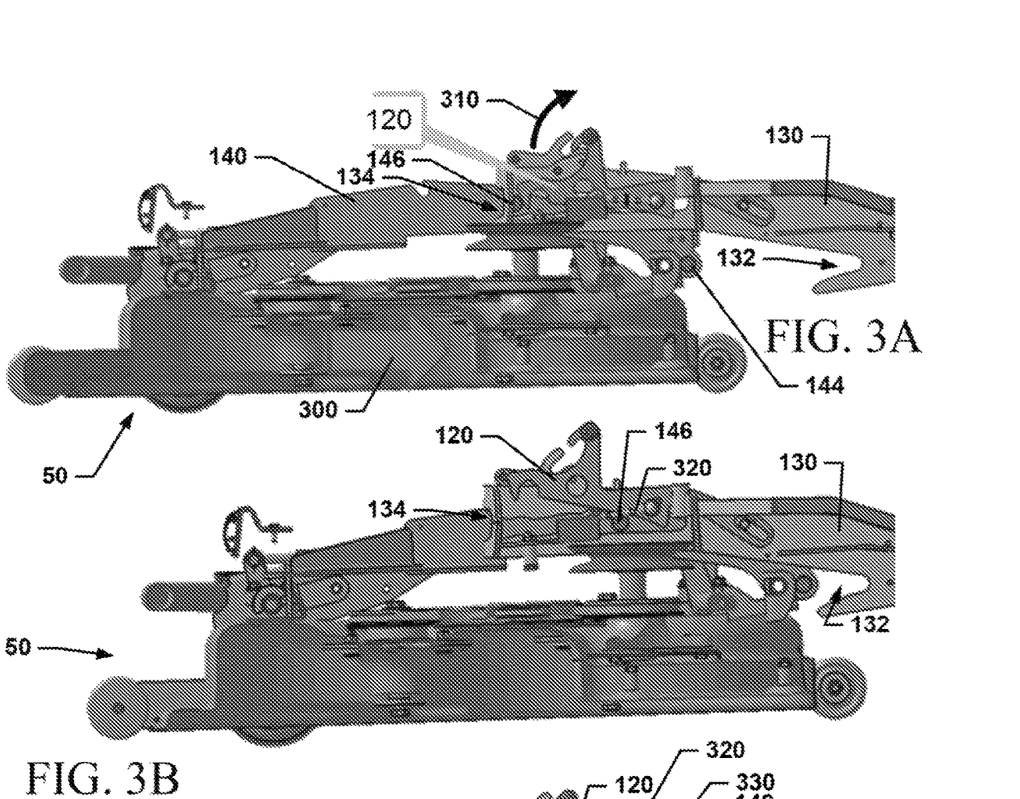
Figure 3C:
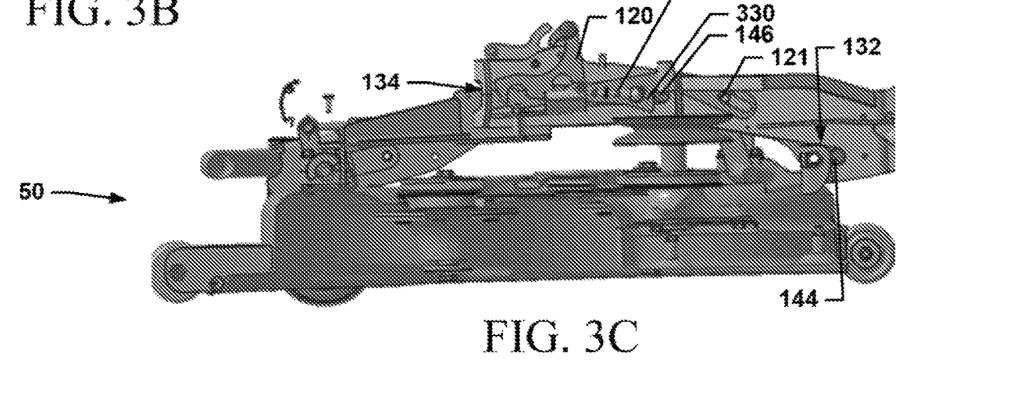

Attachment of the attachment frame 52 of the cutting deck 50 to the equipment frame 60 will now be described in reference to FIG. 3, which is defined by FIGS. 3A, 3B and 3C. In this regard, FIG. 3 shows cross section views. Thus, the interaction shown is the interaction between the guide rail 130 on the right side of the riding lawn care vehicle 10 and the first rail 140. As shown in FIG. 3A, when initial contact is made between the connection stud 146 and the distal end of the equipment lock latch 120, the guide rail 130 on the right side of the riding lawn care vehicle 10 and the first rail 140 are substantially aligned and the cutting deck 50 can be moved rearward in the direction of arrow 300. At this point, the connection stud 146 is substantially aligned with the positional adjustment slot 134, and the connection stud 144 is substantially aligned with the guide slot 132 due to the different respective elevations thereof. A cross bar of the equipment lock latch 120 may be lifted in the direction of arrow 310 (e.g., by the operator or by a remote actuator operably coupled to the cross bar) to allow the connection stud 146 to pass under the distal end of the equipment lock latch 120.

Transitioning to FIG. 3B, the equipment lock latch 120 may slide along the connection stud 146 thereby lifting the equipment lock latch 120 against the biasing force exerted by a biasing element 320 (e.g., a spring) operably coupled between the equipment lock latch 120 and a portion of the equipment frame 60. The connection stud 146 is, by this point, within the positional adjustment slot 134, but not yet fully seated therein. The connection stud 144 is also just beginning to enter into the guide slot 132 as rearward motion in the direction of arrow 300 continues.

Finally, as shown in FIG. 3C, when the connection stud 146 reaches the proximal end of the positional adjustment slot 134, the connection stud 144 is also fully seated at the apex of the guide slot 132. At this point, a connection hook 330 formed at a portion of the equipment lock latch 120 passes over the connection stud 144 to retain the connection stud 144 at the apex (i.e., at the proximal end) of the positional adjustment slot 134. The connection hook 330 may be drawn into position retaining the connection stud 146 by the biasing element 320. However, in some embodiments, the biasing element 320 may be omitted and gravity and/or friction may retain the connection hook 330 in position to retain the connection stud 146.

To remove the cutting deck 50, the reverse operations are employed. Thus, for example, the cross bar of the equipment lock latch 120 may be lifted (e.g., in the direction of arrow 310) until the connection hook 330 no longer retains the connection stud 146. The cutting deck 50 may then be withdrawn in the direction opposite the direction of arrow 300 until the connection stud 144 is withdrawn from the guide slot 132 and the connection stud 146 is withdrawn from the positional adjustment slot 134.

Figure 4A:
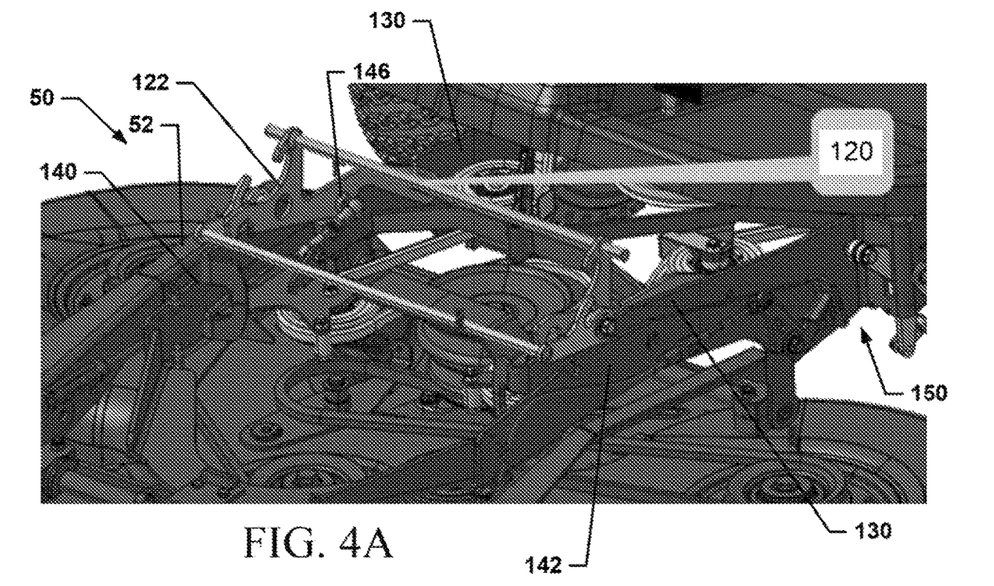
Figure 4B:
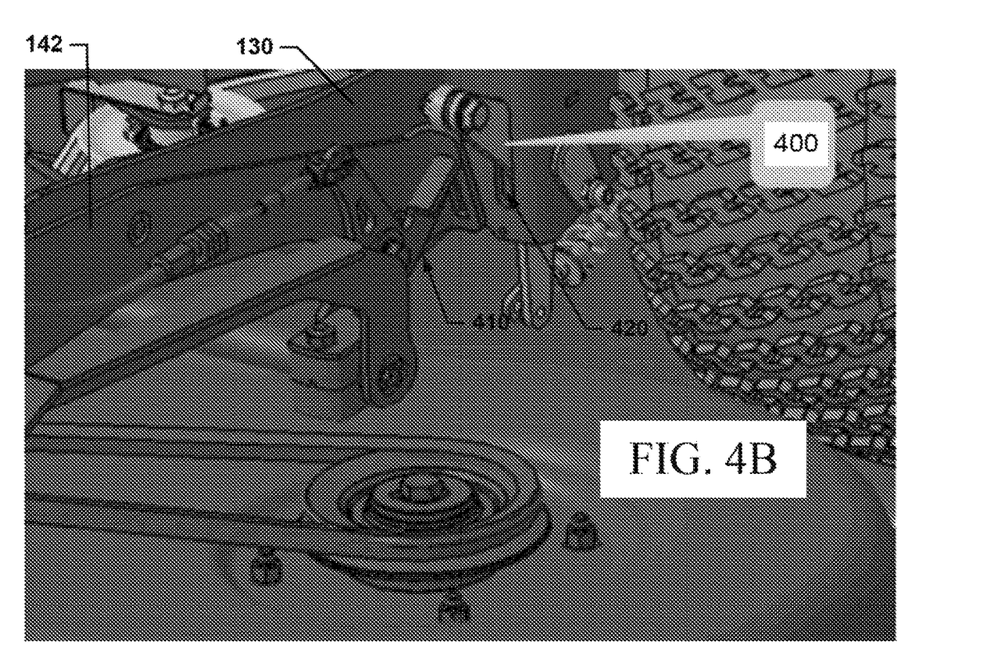

When the cutting deck 50 reaches the position shown in FIG. 3C, the cutting deck 50 is considered docked or mated with the equipment frame 60 and is therefore in the connected state. When the connected state is established, the two respective portions of the height adjustment assembly 150 are generally positioned proximate to each other in a manner that allows them to interact thereafter responsive to operation of the lever 155 shown in FIG. 6. FIG. 4, which is defined by FIGS. 4A and 4B, illustrates a perspective view of the equipment frame 60 and the attachment frame 52 in the connected state to show how the height adjustment assembly 150 may be poised for operation when the cutting deck 50 is docked. FIG. 4B shows a close-up view of the height adjustment assembly 150 of FIG. 4A.

As shown in FIG. 4B, the height adjustment assembly 150 may include a first pivot arm 400 that is operably coupled to the riding lawn care vehicle 10, and also includes a second pivot arm 410 that is operably coupled to the cutting deck 50. In this example, the first pivot arm 400 is pivotally mounted to the guide rail 130 on a left side of the equipment frame 60, and passes through a slot 420 formed in a proximal end of the guide rail 130. However, the first pivot arm 410 could alternatively be pivotally mounted to the chassis or vehicle frame or to another portion of the riding lawn care vehicle 10, and could be on either side of the riding lawn care vehicle 10. In this example, the second pivot arm 410 is pivotally mounted to the second rail 142 on a left side of the cutting deck 50 on an outwardly facing surface of the second rail 142. However, the second pivot arm 410 could alternatively be pivotally mounted to the first rail 140 if the first pivot arm 400 is mounted on the right side of the riding lawn care vehicle 10.

Figure 5A:
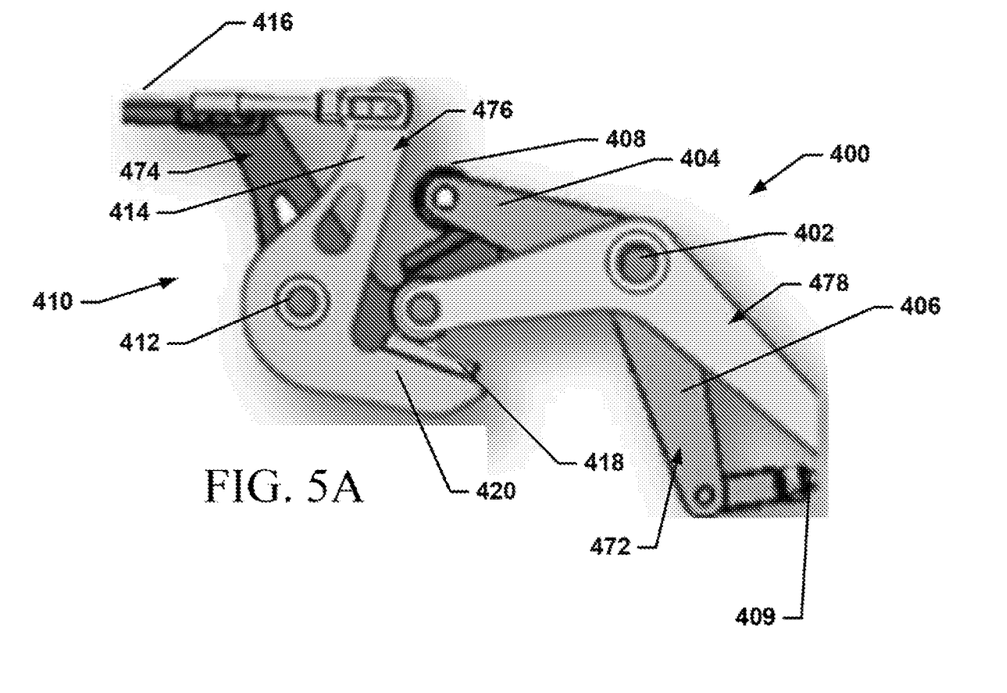
FIG. 5A illustrates a range of motion of a first pivot arm of the height adjustment assembly and the second pivot arm of the height adjustment assembly for adjustment of cutting height in accordance with an example embodiment.
Figure 5B:
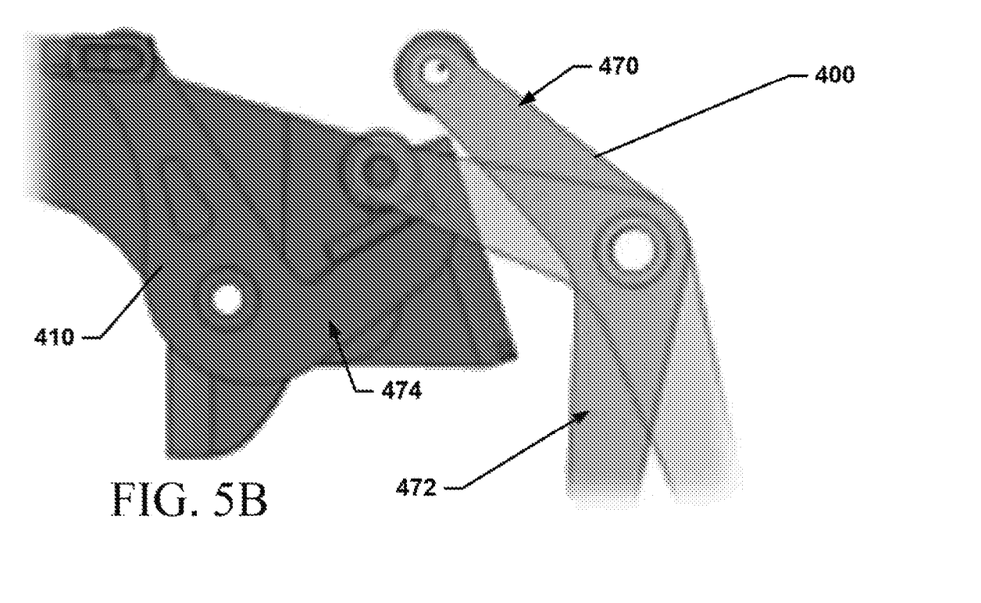
FIG. 5B illustrates a range of motion of the first pivot arm for equipment detachment in accordance with an example embodiment.
Figure 6:
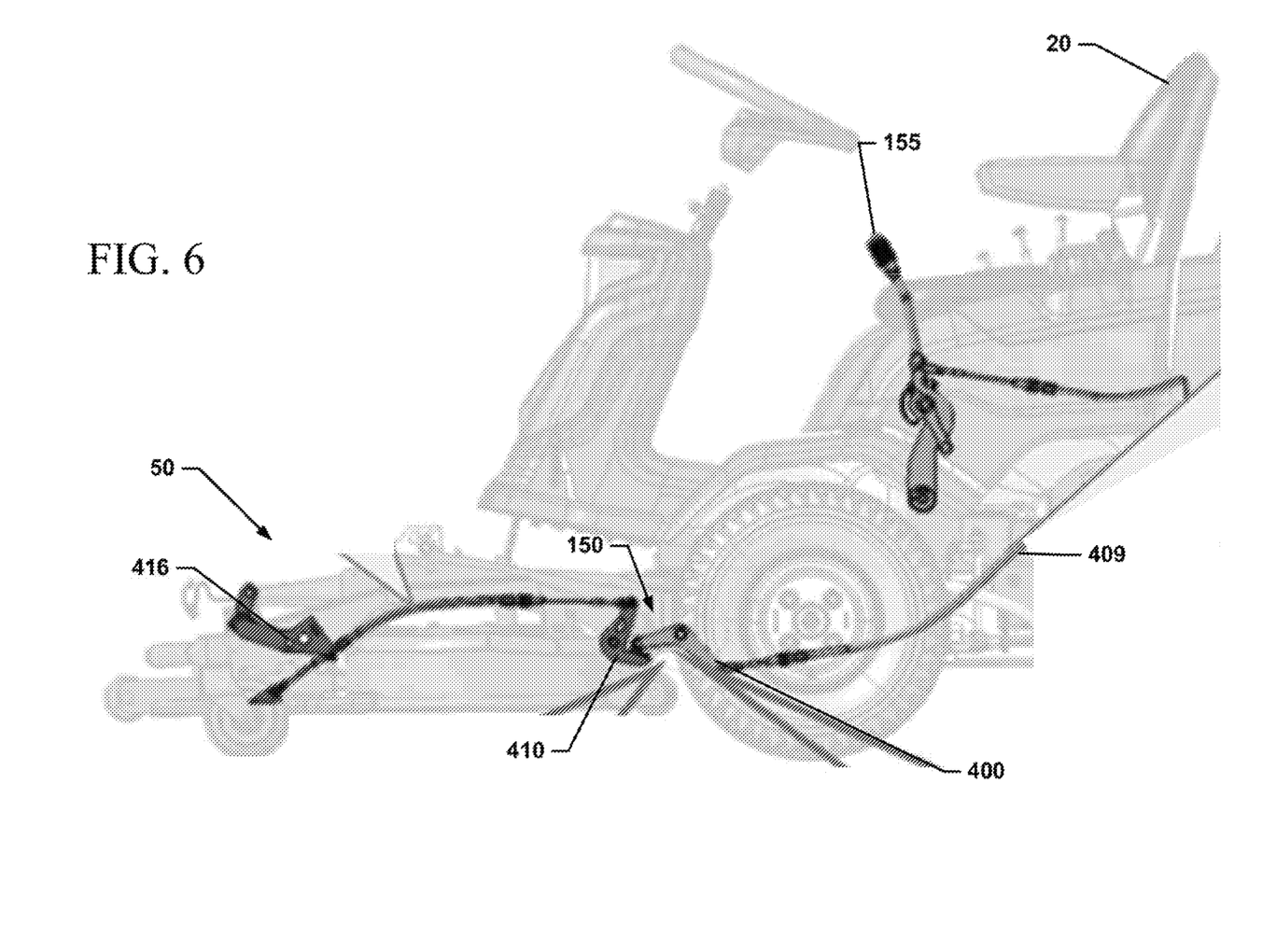
FIG. 6 shows a full view of a system for making cutting deck height adjustments according to an example embodiment with the components of the system highlighted and other portions of the riding lawn care vehicle in the background.

FIG. 5A illustrates a range of motion of the first pivot arm 400 and the second pivot arm 410 for adjustment of cutting height, and FIG. 5B illustrates a range of motion of the first pivot arm 400 for equipment detachment in accordance with an example embodiment. FIG. 6 shows a full view of a system for making cutting deck height adjustments according to an example embodiment with the components of the system highlighted and other portions of the riding lawn care vehicle 10 in the background. As can be appreciated from FIGS. 5A and 6, the second pivot arm 410 may have a substantially L shape or V shape with a pivot point 412 disposed proximate to an apex of the L or V shape. A first lever arm 414 may extend away from the pivot point 412 to engage a cable 416 at a distal end of the first lever arm 414. Meanwhile, a sliding surface 418 may be disposed on a second lever arm 420, which extends away from the pivot point 412 at about 90 degrees away from the first lever arm 414. In this example, the second lever arm 420 is shorter than the first lever arm 414.

The first pivot arm 400 may include a pivot point 402 at which the first pivot arm 400 is pivotally mounted to the guide rail 130. The first pivot arm 400 may include a first lever 404 and a second lever 406 that each extend away from the pivot point 402 and are separated from each other by an angle greater than 90 degrees. In this example, the angular separation may be about 120 degrees. However, any suitable angular separation may be employed in other example embodiments. A distal end of the first lever 404 may include a contactor 408 and a distal end of the second lever 406 may be operably coupled to a cable 409. The contactor 408 may be, for example, a detent, protrusion, roller, knob or other such component that is configured to be slidable along the sliding surface 418 to transfer forces from the cable 409 to the cable 416 via the first pivot arm 400 causing the second pivot arm 410 to pivot. In this regard, for example, the cables 409 and 416 may be Bowden cables or the like, and may be configured to communicate forces between their respective ends.

In an example embodiment, the lever 155 may be disposed substantially at a first end of the cable 409 and the first pivot arm 400 may be disposed at a second end of the cable 409. Movement of the lever 155 may therefore be translated into movement of the first pivot arm 400. The lever 155 may have a range of motion that includes at least a first range during which the first pivot arm 400 is not contacting the second pivot arm 410, and a second range during which the first pivot arm 400 is contacting the second pivot arm 410. Height adjustments to the cutting deck 50 may only be made during movement of the lever 155 over the second range.

In an example embodiment, the first range may include a rest position for the lever 155 at which no height adjustment is made and the first pivot arm 400 is not contacting the second pivot arm 410. When the lever 155 moves out of the rest position, the first pivot arm 410 may move out of its rest position (shown as position 470 in FIG. 5B) to a contact position (shown as position 472 in FIG. 5B). The contact position may define the transition from the first range to the second range of the lever 155. Movement of the lever 155 from position 470 causes a force to be transmitted through the cable 409 to draw the second lever 406 rearward to pivot the second lever 406 so that the first pivot arm moves to the contact position (i.e., position 472). At the contact position, the first pivot arm 400 makes initial contact with the second pivot arm 410 via the contactor 408 touching the sliding surface 418. Position 472 of FIG. 5B is also shown in FIG. 5A, where the second pivot arm 410 is at its rest position 474. Further movement of the lever 155 from position 472

(and corresponding rest position 474 of the second pivot arm 410) causes a force to be transmitted through the cable 409 to draw the second lever 406 farther rearward. The continued drawing of the second lever 406 rearward causes the first lever 404 to exert a force onto the sliding surface 418 via the contactor 408 thereby pivoting the second pivot arm 410. The second pivot arm 410 may be pivoted over a full range of motion from the rest position 474 to a fully deflected position 476 while the first pivot arm 400 completes its range of motion by proceeding to position 478. In the rest position 474, the height of the cutting deck 50 may be at one extreme end of its movement range (e.g., at a minimum height level). Meanwhile, when the second pivot arm 410 moves to the fully deflected position 476, the cutting deck 50 may be at the other extreme end of its movement range (e.g., at a maximum height level).

The lever 155 may be moved from position 470 to 510 in FIG. 5B before any contact is made with the sliding surface 418. Thus, the rest position of the lever 155 coincides with a rest position for both the first and second pivot arms 400 and 410 that does not include any contact between the first and second pivot arms 400 and 410. Accordingly, when the lever 155 is in the rest position, and both the first and second pivot arms 400 and 410 are also in their respective rest positions, the cutting deck 50 and the equipment frame 60 can be engaged or disengaged at will, without any impact on the height adjustment assembly 150. When the cutting deck 50 and the equipment frame 60 are engaged, such engagement also places the first and second pivot arms 400 and 410 in position (i.e., their rest positions) to be engaged with each other responsive to the lever 155 being moved through the first range to engage the first and second pivot arms 400 and 410. Thereafter, the lever 155 can be moved through the second range to define corresponding heights for the cutting deck 50. In an example embodiment, the lever 155 may have a plurality of discrete positions (e.g., defined by slots at the control panel 40) into which the lever 155 may be placed to hold the lever 155 at a corresponding position in the second range. The lever 155 position may define a corresponding position for both of the first and second pivot arms 400 and 410 to control the cutting deck 50 height.

Because the arrangement of the first and second pivot arms 400 and 410 is such that the control of cutting deck height is provided entirely by pushing forces from the first pivot arm 400 to the second pivot arm 410, the height adjustment assembly 150 can effectively be coupled entirely by remote operation conducted by the operator. Thus, the operator need not get out of the riding position (e.g., in the seat 20 or at a stand-on location) to manually couple any components to enable height adjustments. Instead, the docking of the cutting deck 50 with the equipment frame 60 places the first pivot arm 400 proximate to the second pivot arm 410 such that, responsive to operation of the lever 155, push forces can be transmitted from the first pivot arm 400 to control cutting deck height by pivoting the second pivot arm 410. This provides a relatively flexible coupling between the cutting deck 50 and the equipment frame 60 so that longitudinal motion (e.g., pivoting motions about an axis substantially perpendicular to the longitudinal axis of the riding lawn care vehicle 10 near the joint between the cutting deck 50 and the equipment frame 60) is permitted by the structure.

The above described structure provides a "floating" characteristic to the motion permitted for the cutting deck 50 relative to longitudinal motion of the riding lawn care vehicle 10. However, to achieve a "full floating" characteristic, it would also be desirable to provide the cutting deck 50 with the ability to float relative to pendulum motion about the longitudinal axis of the riding lawn care vehicle 10. The interaction between the housing frame 145 and the attachment frame 52 of the cutting deck 50 further provides an accommodation for pendulum motion, and therefore provides the "full floating" characteristic desired.

Figure 7A:
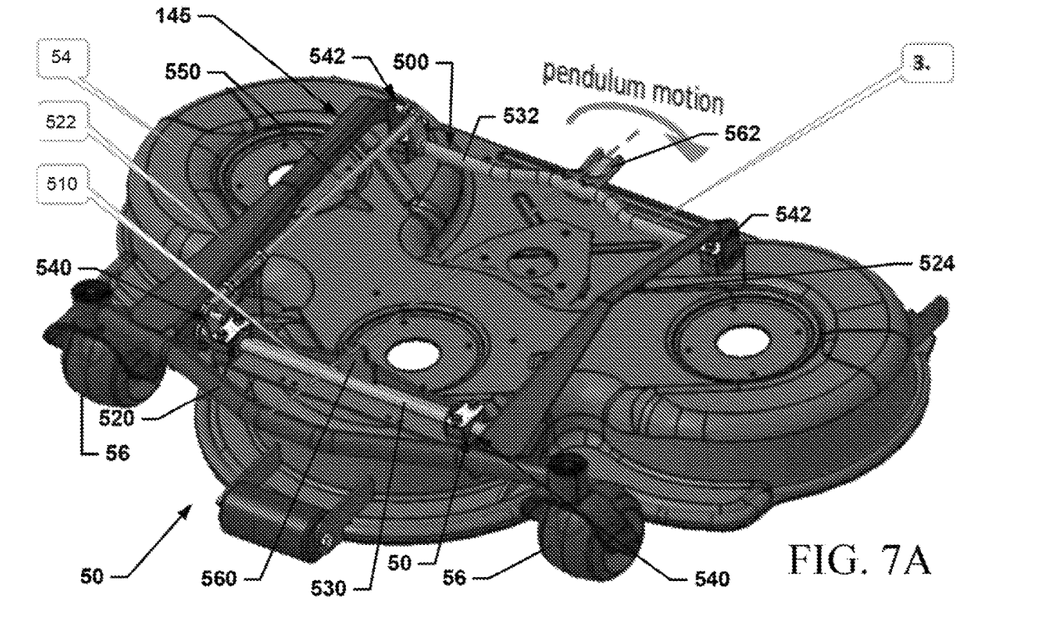
Figure 7B:
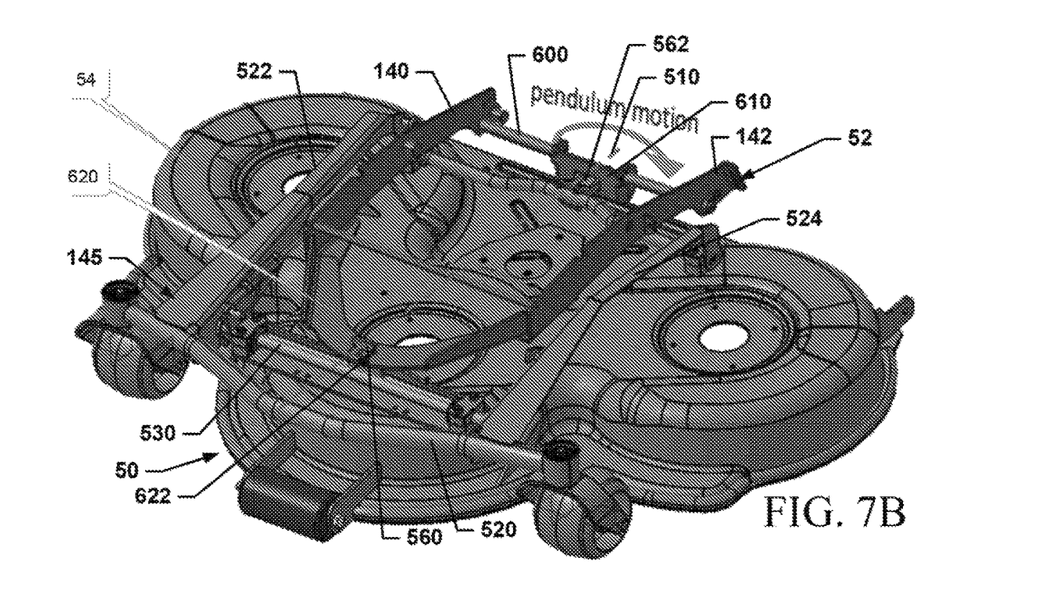

FIG. 7, which is defined by FIGS. 7A and 7B, illustrates a structure of the interaction between the attachment frame 52 and the housing frame 145 in greater detail to explain how pendulum motion can be accounted for in accordance with an example embodiment. In this regard, FIG. 7A illustrates the housing frame 145 without some portions of the attachment frame 52 to facilitate a description of a coupling assembly 500 that may operably couple the attachment frame 52 to the housing frame 145. FIG. 7B then adds in the attachment frame 52 to show how the attachment frame 52 and the housing frame 145 can be operably coupled in a manner that accommodates pendulum motion.

The coupling assembly 500 may be considered to be a portion of the attachment frame 52 or the housing frame 145, or may be considered to be a separate component between the attachment frame 52 and the housing frame 145. Regardless, the coupling assembly 500 provides the attachment points between the attachment frame 52 and the housing frame 145 and does so in a manner that facilitates accommodation for pendulum motion. In particular, the attachment points between the attachment frame 52 and the housing frame 145 are provided along a longitudinal centerline 510 of the riding lawn care vehicle 10.

As shown in FIG. 7A, the housing frame 145 includes a cross member 520 to which the caster wheels 56 are operably coupled. The cross member 520 extends substantially perpendicular to the longitudinal centerline 510 and is bisected by the longitudinal centerline 510. The cross member 520 is operably coupled to a first elongate member 522 and a second elongate member 524. The first and second elongate members 522 and 524 extend rearward over the housing 54 from respective opposing portions of the cross member 520. In an example embodiment, the first and second elongate members 522 and 524 may be affixed to the cross member 520 proximate to opposing ends thereof (e.g., proximate to respective ones of the caster wheels 56). The first and second elongate members 522 and 524 may extend substantially parallel to the longitudinal centerline 510 and be affixed to the housing 54 at respective opposing ends of the first and second elongate members 522 and 524.

The coupling assembly 500 may include a front cross bar 530 and a rear cross bar 532. The front cross bar 530 may, at opposing ends thereof, be operably coupled to front end portions of the first and second elongate members 522 and 524. The rear cross bar 532 may, at opposing ends thereof, be operably coupled to rear end portions of the first and second elongate members 522 and 524. In an example embodiment, the front cross bar 530 may be pivotally attached to the first and second elongate members 522 and 524 by a set of first pivot couplings 540, and the rear cross bar 532 may be pivotally attached to the first and second elongate members 522 and 524 by a set of second pivot couplings 542. The first and second pivot couplings 540 and 542 may each include plastic bearings for reduced weight, to facilitate pivotally coupling the front and rear cross bars 530 and 532 to the first and second elongate members 522 and 524. A linking arm 550 may extend between at least one first pivot coupling 540 and at least one second pivot coupling 542 to allow the front and rear cross bars 530 and 532 to pivot together responsive to cutting height adjustments made via the height adjustment assembly 150.

As shown in FIG. 7A, the front cross bar 530 may include a front mount 560 disposed along the longitudinal centerline 510. The rear cross bar 532 includes a rear mount 562 that is also disposed along the longitudinal centerline 510. As shown in FIG. 7B, the attachment frame 52 is operably coupled to the coupling assembly 500 via the front and rear mounts 560 and 562. In this regard, the attachment frame 52 includes a first cross member 600 that extends between the first and second rails 140 and 142 proximate to a rear end of each of the first and second rails 140 and 142. The first cross member 600 includes a receiving bracket 610 that is disposed substantially at a midpoint of the first cross member 600 to receive the rear mount 562. An opposing end (i.e., a front end) of the first and second rails 140 and 142 may also be coupled to each other via a cross member (i.e., second cross member 620). However, the second cross member 620 may curve to form a U shape as it extends between the first and second rails 140 and 142. An apex of the U shape of the second cross member 620 may include a receiving slot 622 to receive the front mount 560. Both the receiving slot 622 and the receiving bracket 610 may lie along the longitudinal centerline 510 when the cutting deck 50 is installed or being installed onto the riding lawn care vehicle 10.

The first and second rails 140 and 142 of the attachment frame 52 may then be rigidly mounted to the equipment frame 60 of the riding lawn care vehicle 10 as described above. Meanwhile, the caster wheels 56 may be rigidly mounted to the housing frame 145. However, the housing frame 145 may be pivotally mounted to the attachment frame 52 along the longitudinal centerline 510 via the coupling assembly 500 to account for pendulum motion of the cutting deck 50. Meanwhile, the coupling assembly 500 is rigidly mounted to the housing 50 and pivotally mounted to both the housing frame 145 and the attachment frame 52 to allow relative movement therebetween. The relative movement allows the height of the cutting deck 50 to be adjusted by virtue of the fact that when the lever 155 is adjusted over the second range, the cable 409 transmits forces to move the first pivot arm 400 and correspondingly move the second pivot arm 410. Movement of the second pivot arm 410 may pull the cable 416 and consequently also pull up on the cutting deck 50 (by pulling up on the housing 54) to raise the height of the cutting deck 50. In this regard, the coupling assembly 500 may correspondingly allow pivoting of both the first and second pivot couplings 540 and 542 to allow the housing frame 145 and the castor wheels 56 to stay in contact with the ground and the attachment frame 52 to stay fixed relative to the equipment frame 60 while the housing 54 (which is mounted to the coupling assembly 500) can change its height or position between the housing frame 145 and the attachment frame 52. The coupling assembly 500 therefore allows the cutting deck 50 height to be adjusted upward and downward by pivoting so that the relative positioning of the housing 54 between the attachment frame 52 and the housing frame 145 can be adjusted accordingly. The connection of the cutting deck 50 along the longitudinal centerline 510 creates a floating connection with respect to pendulum motion while still allowing height adjustments to be performed.

As such, the cutting deck 50 has greater freedom of movement, independent of the riding lawn care vehicle 10 to respond to terrain features that are beneath the cutting deck 50 that are different than those encountered by the riding lawn care vehicle 10. Thus, for example, if the cutting deck 50 or the riding lawn care vehicle 10 encounters a bump that is as wide as the wheel base when the other is not on the bump, the cutting deck 50 can still ride over the bump without scalding or missing portions of the bump (accounting for longitudinal motion). Meanwhile, if a bump hits only one wheel (e.g., one of the casters 56 or one of the front wheels 34) pendulum motion will be experienced. However, the cutting deck 50 may again respond to the terrain relatively independent of what the riding lawn care vehicle 10 encounters at that time. Combinations of pendulum motion and longitudinal motion can also be accommodated.

It should be appreciated that example embodiments of the present invention provide a new type of configuration for a front mounted riding lawn care vehicle. Example embodiments may provide a riding lawn care vehicle that includes a vehicle frame to which front wheels and rear wheels are operably coupled, an equipment frame operably coupled to the vehicle frame forward of the front wheels, a steering assembly operably coupled to at least one of the front wheels or rear wheels to enable an operator seated on the riding lawn care vehicle to provide steering control of the riding lawn care vehicle, a removable cutting deck comprising at least one rotatable blade, and a height adjustment system. The cutting deck may include an attachment frame and a housing frame. The housing frame may support a housing inside which the at least one rotatable blade is housed. The attachment frame may be configured to operably couple with the equipment frame to releasably connect the cutting deck to the riding lawn care vehicle. The height adjustment system may be configured to enable a height of the cutting deck to be adjusted relative to a ground surface over which the riding lawn care vehicle operates. The height adjustment system may include a lever operable by an operator seated on the riding lawn care vehicle. The height adjustment system may include a height adjustment assembly that is alternately assembled and disassembled during attachment and removal of the cutting deck without any operator interaction other than positioning of the lever. Some example embodiments may also provide a riding lawn care vehicle that includes a vehicle frame, a mobility assembly operably coupled to the vehicle frame, an equipment frame operably coupled to the vehicle frame, wherein the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade, an attachment frame, and a housing frame, and a height adjustment system comprising a lever. The housing frame may be configured to support a housing inside which the cutting blade is housed. The attachment frame may be configured to operably couple to the equipment frame to dock the cutting deck with the riding lawn care vehicle. The lever may be operable by the operator positioned on the riding lawn care vehicle. The cutting deck may be configured to automatically switch from a disconnected state to a connected state in response to docking the cutting deck with the riding lawn vehicle. In the connected state, the lever may be configured to adjust the height of the cutting deck relative to the ground surface over which the riding lawn care vehicle operates. In the disconnected state, the lever is not configured to adjust the height of the cutting deck.

In some cases, the vehicle may include additional optional features, structures or components, or the components described above may be augmented, modified or improved. For example, in some cases, the height adjustment assembly may include a first pivot arm operably coupled to the riding lawn care vehicle, and a second pivot arm operably coupled to the cutting deck. The first and second pivot arms may be disposed proximate to each other during the attachment of the cutting deck without contact therebetween. In some cases, the lever may move over a first range to bring the first pivot arm into contact with the second pivot arm, and move over a second range to move the second pivot arm via slidable contact of the second pivot arm with the first pivot arm. In an example embodiment, the lever is operably coupled to the first pivot arm via a first cable and wherein the second pivot arm is operably coupled to the housing via a second cable. In some examples, the first pivot arm extends through a slot in a guide rail of the equipment frame, and the second pivot arm includes a sliding surface disposed to face, but not contact, a contactor of the first pivot arm until the lever reaches the second range. In an example embodiment, the first pivot arm may include a first lever and a second lever extending away from a pivot point. The second pivot arm may include a first lever and a second lever extending away from a pivot point. The contactor may be disposed on the first lever of the first pivot arm and the first cable may be operably coupled to the second lever of the first pivot arm. The sliding surface may be disposed on the first lever of the second pivot arm and the second cable may be operably coupled to the second lever of the second pivot arm. In some cases, the attachment frame may be operably coupled to the housing frame via a coupling assembly such that connection points between the attachment frame and the housing frame are disposed along a longitudinal centerline of the riding lawn care vehicle. In some examples, the attachment frame may be rigidly coupled to the equipment frame and the housing frame may be rigidly coupled to wheels that contact the ground surface. The coupling assembly may pivotally couple the housing to the attachment frame and the housing frame to enable the height of the cutting deck to be adjusted relative to the ground surface. In an example embodiment, the housing may be disposed at a variable position between the attachment frame and the housing frame to adjust the height of the cutting deck. In some cases, the connection points may be disposed at center portions of a front cross bar and a rear cross bar that each extend between front and rear portions, respectively, of the a first rail and a second rail of the attachment frame.

In still another example, a riding lawn care vehicle is provided that includes a vehicle frame, a mobility assembly operably coupled to the vehicle frame, an equipment frame operably coupled to the vehicle frame, wherein the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade, an attachment frame, and a housing inside which the cutting blade is housed, and a height adjustment system comprising a first portion and a second portion. The first portion is operably coupled to the vehicle frame and comprises an operator control, a first cable, and a first pivot arm, and the second portion is operably coupled to the cutting deck and comprises a second pivot arm and a second cable. The attachment frame is configured to operably couple to the equipment frame to dock the cutting deck with the riding lawn care vehicle. The operator control is operable by the operator positioned on the riding lawn care vehicle. The operator control is operably coupled to the first pivot arm via the first cable. The second pivot arm is operably coupled to the housing via the second cable. The operator control is configured to adjust the height of the cutting deck relative to the ground surface over which the riding lawn care vehicle operates by transferring force from the first cable to the second cable via the first pivot arm and the second pivot arm.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
   a vehicle frame;
   a mobility assembly operably coupled to the vehicle frame;
   an equipment frame operably coupled to the vehicle frame, wherein the equipment frame extends forward of the mobility assembly;
   a steering assembly operably coupled to the mobility assembly to enable an operator positioned on the riding lawn care vehicle to provide steering control of the riding lawn care vehicle;
   a removable cutting deck comprising a cutting blade, an attachment frame, and a housing frame, wherein the housing frame is configured to support a housing inside which the cutting blade is housed, and wherein the attachment frame is configured to operably couple to the equipment frame to dock the cutting deck with the riding lawn care vehicle; and
   a height adjustment system comprising a lever, wherein the lever is operable by the operator positioned on the riding lawn care vehicle,
   wherein the cutting deck is configured to automatically switch from a disconnected state to a connected state in response to docking the cutting deck with the riding lawn care vehicle,
   wherein, in the connected state, the lever is configured to adjust the height of the cutting deck relative to the ground surface over which the riding lawn care vehicle operates,
   wherein, in the disconnected state, the lever is not configured to adjust the height of the cutting deck, and
   wherein the height adjustment system comprises a height adjustment assembly comprising a first pivot arm operably coupled to the riding lawn care vehicle, and a second pivot arm operably coupled to the cutting deck, the first and second pivot arms being disposed proximate to each other while docking the cutting deck without operable coupling therebetween.

2. The riding lawn care vehicle of claim 1, wherein the lever moves over a first range to bring the first pivot arm into contact with the second pivot arm, and moves over a second range to move the second pivot arm via slidable contact of the second pivot arm with the first pivot arm.

3. The riding lawn care vehicle of claim 2, wherein the lever is operably coupled to the first pivot arm via a first cable and wherein the second pivot arm is operably coupled to the housing via a second cable.

4. The riding lawn care vehicle of claim 3, wherein the first pivot arm extends through a slot in a guide rail of the equipment frame, wherein the second pivot arm comprises a sliding surface disposed to face, but not contact, a contactor of the first pivot arm until the lever reaches the second range.

5. The riding lawn care vehicle of claim 4, wherein the first pivot arm comprises a first lever and a second lever extending away from a pivot point, wherein the second pivot arm comprises a first lever and a second lever extending away from a pivot point, wherein the contactor is disposed on the first lever of the first pivot arm and the first cable is operably coupled to the second lever of the first pivot arm, and wherein the sliding surface is disposed on the first lever of the second pivot arm and the second cable is operably coupled to the second lever of the second pivot arm.

6. The riding lawn care vehicle of claim 1, wherein the attachment frame is operably coupled to the housing frame via a coupling assembly such that connection points between the attachment frame and the housing frame are disposed along a longitudinal centerline of the riding lawn care vehicle.

7. The riding lawn care vehicle of claim 6, wherein the attachment frame is rigidly coupled to the equipment frame and the housing frame is rigidly coupled to wheels that contact the ground surface, and wherein the coupling assembly pivotally couples the housing to the attachment frame and the housing frame to enable the height of the cutting deck to be adjusted relative to the ground surface.

8. The riding lawn care vehicle of claim 7, wherein the housing is disposed at a variable position between the attachment frame and the housing frame to adjust the height of the cutting deck.

9. The riding lawn care vehicle of claim 6, wherein the connection points are disposed at center portions of a front cross bar and a rear cross bar that each extend between front and rear portions, respectively, of the a first rail and a second rail of the attachment frame.

10. A height adjustment system for adjusting a cutting deck height of a front mounted cutting deck of a riding lawn care vehicle, the system comprising:
a lever operable by an operator seated on the riding lawn care vehicle; and
a height adjustment assembly that is alternately assembled and disassembled during attachment and removal of the cutting deck without any operator interaction other than positioning of the lever,
wherein the height adjustment assembly comprises a first pivot arm operably coupled to the riding lawn care vehicle, and a second pivot arm operably coupled to the cutting deck, the first and second pivot arms being disposed proximate to each other while docking the cutting deck without operable coupling therebetween.

11. The system of claim 10, wherein the lever moves over a first range to bring the first pivot arm into contact with the second pivot arm, and moves over a second range to move the second pivot arm via slidable contact of the second pivot arm with the first pivot arm, and
wherein the lever is operably coupled to the first pivot arm via a first cable and wherein the second pivot arm is operably coupled to the housing via a second cable.

12. The system of claim 11, wherein the first pivot arm extends through a slot in a guide rail of an equipment frame of the riding lawn care vehicle to which an attachment frame of the cutting deck is removably mounted, wherein the second pivot arm comprises a sliding surface disposed to face, but not contact, a contactor of the first pivot arm until the lever reaches the second range.

13. The system of claim 12, wherein the first pivot arm comprises a first lever and a second lever extending away from a pivot point, wherein the second pivot arm comprises a first lever and a second lever extending away from a pivot point, wherein the contactor is disposed on the first lever of the first pivot arm and the first cable is operably coupled to the second lever of the first pivot arm, and wherein the sliding surface is disposed on the first lever of the second pivot arm and the second cable is operably coupled to the second lever of the second pivot arm.

14. The system of claim 10, wherein an attachment frame of the cutting deck is operably coupled to a housing frame that supports a housing of the cutting deck via a coupling assembly such that connection points between the attachment frame and the housing frame are disposed along a longitudinal centerline of the riding lawn care vehicle.

15. The system of claim 14, wherein the attachment frame is rigidly coupled to an equipment frame of the riding lawn care vehicle and the housing frame is rigidly coupled to wheels that contact the ground surface, and wherein the coupling assembly pivotally couples the housing to the attachment frame and the housing frame to enable the height of the cutting deck to be adjusted relative to the ground surface.

16. The system of claim 15, wherein the housing is disposed at a variable position between the attachment frame and the housing frame to adjust the height of the cutting deck.

17. The system of claim 14, wherein the connection points are disposed at center portions of a front cross bar and a rear cross bar that each extend between front and rear portions, respectively, of the a first rail and a second rail of the attachment frame.

18. A riding lawn care vehicle comprising:
a vehicle frame;
a mobility assembly operably coupled to the vehicle frame;
an equipment frame operably coupled to the vehicle frame, wherein the equipment frame extends forward of the mobility assembly;
a steering assembly operably coupled to the mobility assembly to enable an operator positioned on the riding lawn care vehicle to provide steering control of the riding lawn care vehicle;
a removable cutting deck comprising a cutting blade, an attachment frame, and a housing inside which the cutting blade is housed, wherein the attachment frame is configured to operably couple to the equipment frame to dock the cutting deck with the riding lawn care vehicle; and
a height adjustment system comprising a first portion and a second portion, wherein the first portion is operably coupled to the vehicle frame and comprises an operator control, a first cable, and a first pivot arm, and wherein the second portion is operably coupled to the cutting deck and comprises a second pivot arm and a second cable, wherein the operator control is operable by the operator positioned on the riding lawn care vehicle, wherein the operator control is operably coupled to the first pivot arm via the first cable, and wherein the second pivot arm is operably coupled to the housing via the second cable, and wherein the operator control is configured to adjust the height of the cutting deck relative to the ground surface over which the riding lawn care vehicle operates by transferring force from the first cable to the second cable via the first pivot arm and the second pivot arm.

* * * * *